(12) United States Patent
Liu et al.

(10) Patent No.: US 11,921,742 B2
(45) Date of Patent: Mar. 5, 2024

(54) METHOD AND APPARATUS FOR INTELLIGENT VISUAL ANALYSIS AND DISPLAY OF CROSS-SOURCE HETEROGENEOUS DATA

(71) Applicant: BEIJING BORRUI DATA TECHNOLOGY CO., LTD., Beijing (CN)

(72) Inventors: Ruimin Liu, Beijing (CN); Shuihan Yi, Beijing (CN)

(73) Assignee: BEIJING BORRUI DATA TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/265,537

(22) PCT Filed: Jun. 10, 2022

(86) PCT No.: PCT/CN2022/098023
§ 371 (c)(1),
(2) Date: Jun. 6, 2023

(87) PCT Pub. No.: WO2023/040373
PCT Pub. Date: Mar. 23, 2023

(65) Prior Publication Data
US 2023/0394061 A1  Dec. 7, 2023

(30) Foreign Application Priority Data
Sep. 14, 2021  (CN) .......................... 202111074736.X

(51) Int. Cl.
*G06F 16/26* (2019.01)
*G06F 16/22* (2019.01)
(Continued)

(52) U.S. Cl.
CPC .......... *G06F 16/26* (2019.01); *G06F 16/2282* (2019.01); *G06F 16/252* (2019.01); *G06F 16/27* (2019.01)

(58) Field of Classification Search
CPC ...................................................... G06F 16/26
(Continued)

(56) References Cited

U.S. PATENT DOCUMENTS

| | | | |
|---|---|---|---|
| 9,411,864 B2 * | 8/2016 | Glider | G06F 40/151 |
| 2010/0161593 A1 * | 6/2010 | Paulsen | G06F 3/0481 715/764 |

(Continued)

FOREIGN PATENT DOCUMENTS

| | | |
|---|---|---|
| CN | 105205085 A | 12/2015 |
| CN | 107066499 A | 8/2017 |

(Continued)

OTHER PUBLICATIONS

International Search Report dated Aug. 26, 2022 for PCT/CN2022/098023.

*Primary Examiner* — Muluemebet Gurmu
(74) *Attorney, Agent, or Firm* — Schmeiser, Olsen & Watts, LLP

(57) ABSTRACT

A method and apparatus for intelligent visual analysis and display of cross-source heterogeneous data including: when a visual display command for the target heterogeneous data is detected, creating a connector in the distributed in-memory database corresponding to each target data source where the target heterogeneous data is located via a JDBC driver; in the visual data intelligence platform, the python driver of the distributed in-memory database and the SQLAlchemy framework create the connection between the visual data intelligence platform and the distributed in-memory database, and generating SQL table building statements in the visual data intelligence platform based on the association (Continued)

Figure 1:
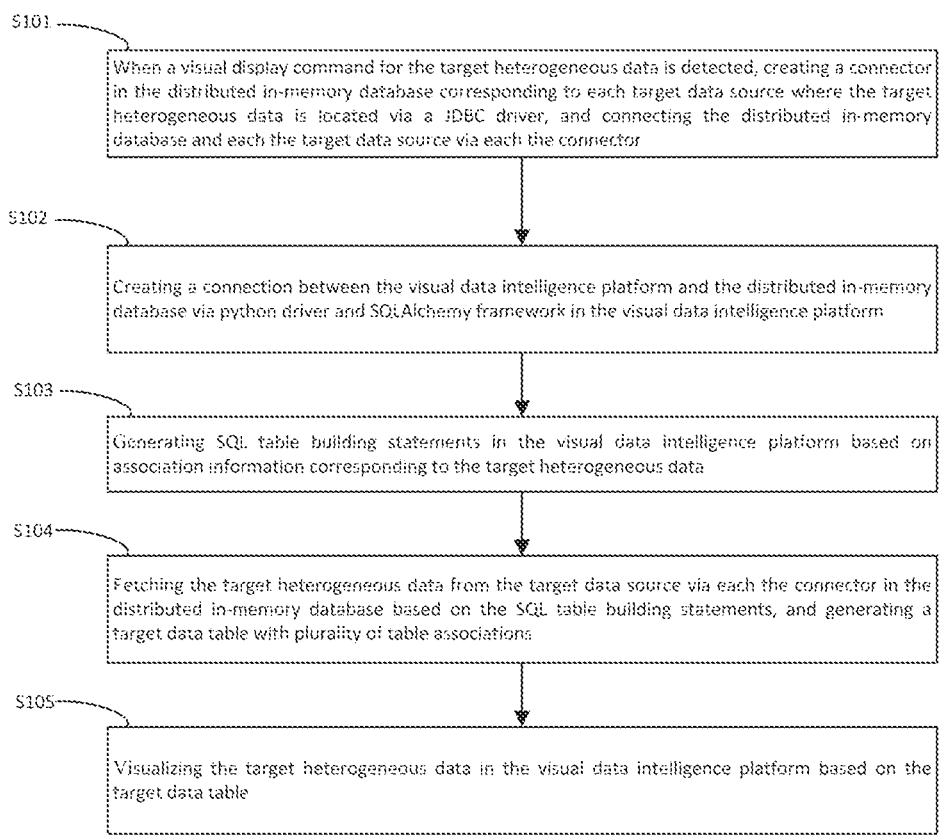

information corresponding to the target heterogeneous data; generating the target data table with plurality of table associations in the distributed in-memory database based on the SQL table building statements; the target heterogeneous data is visualized and displayed in the visual data intelligence platform based on the target data.

9 Claims, 3 Drawing Sheets

(51) Int. Cl.
  *G06F 16/25* (2019.01)
  *G06F 16/27* (2019.01)
(58) Field of Classification Search
  USPC .......................................................... 707/756
  See application file for complete search history.

(56) References Cited

U.S. PATENT DOCUMENTS

2016/0092594 A1* 3/2016 Deshmukh .............. G06F 16/86
  707/763
2019/0235844 A1* 8/2019 Ball ...................... G06F 3/0685

FOREIGN PATENT DOCUMENTS

| CN | 110032590 A | 7/2019 |
| CN | 111857659 A | 10/2020 |
| CN | 113901135 A | 1/2022 |

* cited by examiner

METHOD AND APPARATUS FOR INTELLIGENT VISUAL ANALYSIS AND DISPLAY OF CROSS-SOURCE HETEROGENEOUS DATA

CROSS-REFERENCE TO RELATED APPLICATIONS

This application claims priority to PCT Application No. PCT/CN2022/098023, having a filing date of Jun. 10, 2022, which claims priority to CN Application No. 202111074736.X, having a filing date of Sep. 14, 2021, the entire contents of both of which are hereby incorporated by reference.

FIELD OF TECHNOLOGY

The following relates to the technical field of intelligent analysis of computer big data, and more specifically, to a method and apparatus for intelligent visual analysis and display of cross-source heterogeneous data.

BACKGROUND

Different business systems of enterprises are often scattered in different databases, and obey the database three paradigms. When conducting business intelligence analysis, it is often necessary to correlate the data tables of different business systems to form a wide table, and then convert the data in the table into corresponding graphics or tables for visual display, so that the boring data looks more intuitive and easy to understand.

In order to form a wide table after associating data tables of different business systems, it is necessary to search and analyze data from different databases in a cross-database association, thus forming a wide table. Generally speaking, there are two traditional ways to achieve cross-library correlation search analysis: one is to extract the relevant data from different databases to a unified library through a separate ETL data conversion tool, and then performing search and analysis operations on the data in the database, eventually forming a wide table, and then performing data visual conversion, thus visualizing the display; another is to reconstruct the existing business code, making a join association and searching the data in the business code.

The first way in the extraction of data will cause performance pressure on the production database, and can not capture the data changes in the production database in real time, while the data extraction to external databases, there will be data security issues. The second way will directly affect the business system, depending on the business system interface transformation will often involve interface costs with vendor.

Therefore, how to achieve cross-source heterogeneous data visual display without changing the data in the production database and without affecting the business code is a technical problem to be solved.

SUMMARY

An aspect relates to a method for intelligent visual analysis and display of cross-source heterogeneous data, to solve the technical problem of the conventional art of not being able to realize cross-source heterogeneous data visual display without changing the data of the production database and without affecting the business code.

In embodiments, the method is applied to a system comprising a visual data intelligence platform, a distributed in-memory database and a plurality of heterogeneous data sources, comprising:
  when a visual display command for the target heterogeneous data is detected, creating a connector in the distributed in-memory database corresponding to each target data source where the target heterogeneous data is located via a JDBC driver, and connecting the distributed in-memory database and each the target data source via each the connector;
  creating a connection between the visual data intelligence platform and the distributed in-memory database via python driver and SQLAlchemy framework in the visual data intelligence platform;
  generating SQL table building statements in the visual data intelligence platform based on association information corresponding to the target heterogeneous data;
  fetching the target heterogeneous data from the target data source via each the connector in the distributed in-memory database based on the SQL table building statements, and generating a target data table with plurality of table associations;
  visualizing the target heterogeneous data in the visual data intelligence platform based on the target data table;
  wherein the association information includes an association data table, an association field and an association type.

In some embodiments of the present invention, visualizing the target heterogeneous data in the visual data intelligence platform based on the target data table, specifically by:
  mapping the associated data table to the target data table based on the SQLAlchemy framework, and recording the target table name of the target data table in the metadata database;
  selecting the target table name in the visual data intelligence platform, and obtaining the visual data corresponding to the target data table from the distributed in-memory database based on the target table name;
  returning the visual data to the front end for visual display of the target heterogeneous data.

In some embodiments of the present invention, obtaining the visual data corresponding to the target data table from the distributed in-memory database based on the target table name, specifically by:
  generating SQL statements based on the target table names;
  searching the distributed in-memory database based on the SQL statement, and obtaining the visual data based on the search results.

In some embodiments of the present invention, fetching the target heterogeneous data from the target data source via each the connector in the distributed in-memory database based on the SQL table building statements, and generating a target data table with plurality of table associations, specifically by:
  splitting the SQL table building statement into a plurality of single table search statements;
  sequentially extracting the target heterogeneous data from each the target data source to the distributed in-memory database via each the connector according to each the single table search statement, and generating the target data table in the distributed in-memory database.

In some embodiments of the present invention, after creating a connector in the distributed in-memory database corresponding to each target data source where the target heterogeneous data is located via a JDBC driver, the method further comprising:

mapping the table name information of the associated data table to the distributed in-memory database based on the connector name, the data source name of the target data source, and the table name of the associated data table.

In some embodiments of the present invention, mapping the table name information of the associated data table to the distributed in-memory database based on the connector name, the data source name of the target data source, and the table name of the associated data table, specifically by:

using the connector name as the Catalog of the distributed in-memory database, the data source name as the Schema of the distributed in-memory database, and the table name as the Table of the distributed in-memory database.

mapping the table name information to the distributed in-memory database based on Catalog. Schema. table.

In some embodiments of the present invention, before generating SQL table building statements in the visual data intelligence platform based on association information corresponding to the target heterogeneous data, the method further comprises:

selecting and adding the association information in the visual data intelligence platform.

In some embodiments of the present invention, the associated data table is added to the visual data intelligence platform based on a data table association mapping, the data table association mapping being determined based on the connection name of the visual data intelligence platform to the distributed in-memory database, the connector name and the table name.

Accordingly, embodiments of the present invention further provide an apparatus for intelligent visual analysis and display of cross-source heterogeneous data, it is applied to a system comprising a visual data intelligence platform, a distributed in-memory database and a plurality of heterogeneous data sources, the apparatus comprises:

a first creation module, for when a visual display command for the target heterogeneous data is detected, creating a connector in the distributed in-memory database corresponding to each target data source where the target heterogeneous data is located via a JDBC driver, and connecting the distributed in-memory database and each the target data source via each the connector;

a second creation module, for creating a connection between the visual data intelligence platform and the distributed in-memory database via python driver and SQLAlchemy framework in the visual data intelligence platform;

a first generation module, for generating SQL table building statements in the visual data intelligence platform based on association information corresponding to the target heterogeneous data;

a second generation module, for fetching the target heterogeneous data from the target data source via each the connector in the distributed in-memory database based on the SQL table building statements, and generating a target data table with plurality of table associations;

a display module, for visualizing the target heterogeneous data in the visual data intelligence platform based on the target data table;

wherein the association information includes an association data table, an association field and an association type.

Accordingly, embodiments of the present invention further provide a computer-readable storage medium, the computer-readable storage medium has commands stored in it, when the commands are run on the terminal equipment, causing the terminal equipment to perform the method for intelligent visual analysis and display of cross-source heterogeneous data as described above.

By applying the above technical solution, in a system including a visual data intelligence platform, a distributed in-memory database and a plurality of heterogeneous data sources, when a visual display command for the target heterogeneous data is detected, creating a connector in the distributed in-memory database corresponding to each target data source where the target heterogeneous data is located via a JDBC driver, and connecting the distributed in-memory database and each the target data source via each the connector; creating a connection between the visual data intelligence platform and the distributed in-memory database via python driver and SQLAlchemy framework in the visual data intelligence platform; generating SQL table building statements in the visual data intelligence platform based on association information corresponding to the target heterogeneous data; fetching the target heterogeneous data from the target data source via each the connector in the distributed in-memory database based on the SQL table building statements, and generating a target data table with plurality of table associations; visualizing the target heterogeneous data in the visual data intelligence platform based on the target data table, and achieving intelligent visual analysis and display of cross-source heterogeneous data without changing the data in the production database and without affecting the business code, which improves the data processing efficiency and security, and avoids the cost increase caused by the interface transformation.

BRIEF DESCRIPTION

Figure 2:
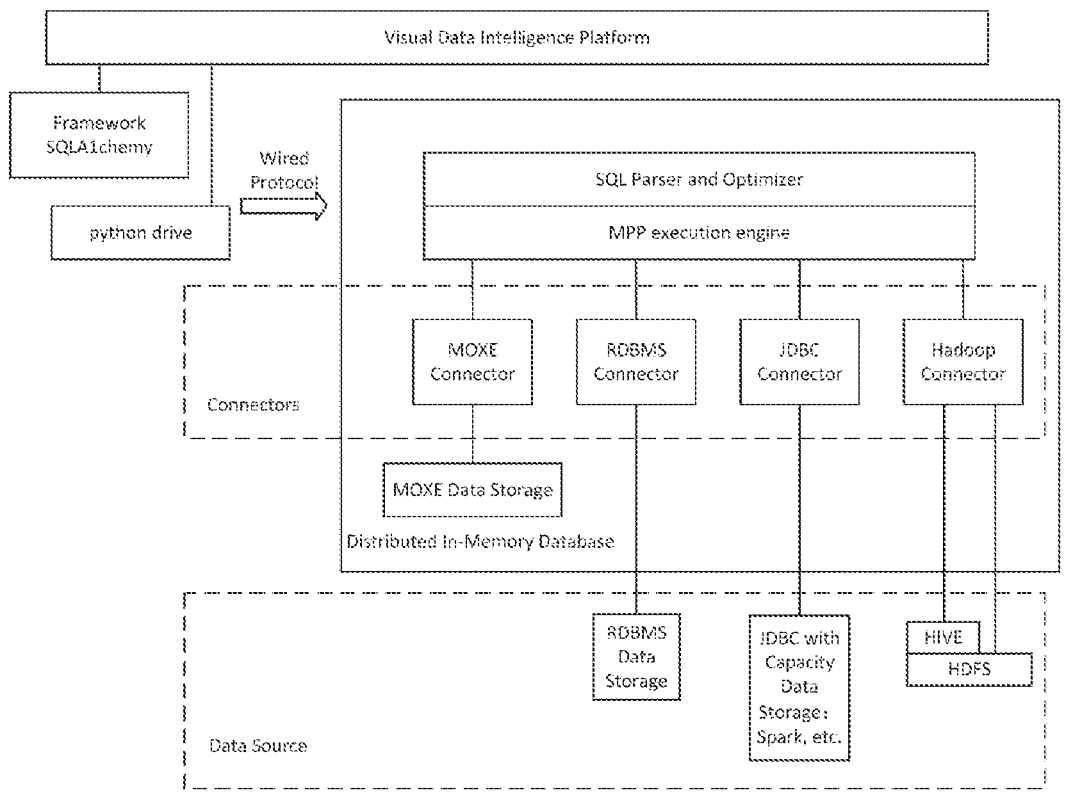
Figure 3:
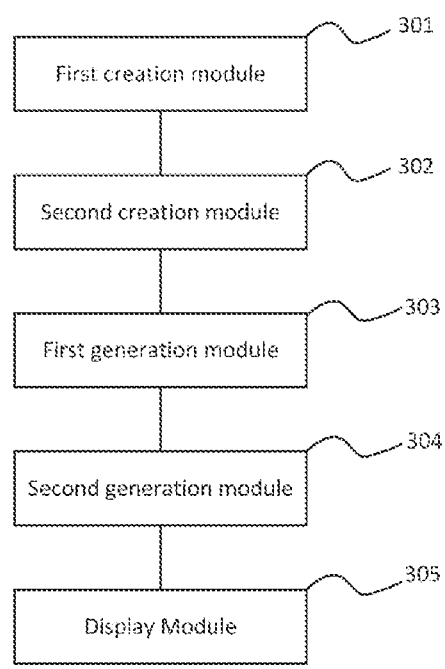

Some of the embodiments will be described in detail, with references to the following Figures, wherein like designations denote like members, wherein:

FIG. 1 illustrates a flow diagram of a method for intelligent visual analysis and display of cross-source heterogeneous data proposed by an embodiment of the present invention;

FIG. 2 illustrates a schematic diagram of the structure of a system including a visual data intelligence platform, a distributed in-memory database, and a plurality of heterogeneous data sources in an embodiment of the present invention; and FIG. 3 illustrates a schematic diagram of the structure of an apparatus for intelligent visual analysis and display of cross-source heterogeneous data proposed by embodiments of the present invention.

DETAILED DESCRIPTION

The following is a clear and complete description of the technical solutions in the embodiments of this application in conjunction with the drawings in the embodiments of this application, and it is clear that the embodiments described are only part of the embodiments of this application, not all of them. Based on the embodiments in this application, all other embodiments obtained by a person of ordinary skill in the conventional art without creative labor fall within the scope of protection of this application.

Embodiments of the invention provide a method for intelligent visual analysis and display of cross-source heterogeneous data, it is applied to a system comprising a visual data intelligence platform, a distributed in-memory database and a plurality of heterogeneous data sources, the method comprising the following steps:

Step S101, when a visual display command for the target heterogeneous data is detected, creating a connector in the distributed in-memory database corresponding to each target data source where the target heterogeneous data is located via a JDBC driver, and connecting the distributed in-memory database and each the target data source via each the connector.

In this implementation, the target heterogeneous data includes at least two heterogeneous data stored in different heterogeneous data sources, for example, the target heterogeneous data includes tableA.c1 field and tableB.c1 field, the tableA.c1 field is stored in the MySQL database in the data table dbA.tableA, and the tableB.c1 field is stored in the PostgreSQL database in the data table dbB.tableB.

In embodiments, the method is applied to to a system comprising a visual data intelligence platform, a distributed in-memory database and a plurality of heterogeneous data sources, when a visual display of the target heterogeneous data is required, such as pie chart display, histogram display, etc., the user can input the corresponding visual display command at the front end of the visual data intelligence platform, and when the visual display command is detected, the visual display command is displayed in the distributed in-memory database via JDBC (Java Database Connectivity) driver creates connectors corresponding to each target data source where the target heterogeneous data is located, and each connector is a process used to connect the distributed in-memory database and each target data source.

In order to further improve data processing efficiency, in the embodiment of the present invention, the distributed in-memory database adopts an all-memory distributed MPP architecture, MPP (Massively Parallel Processing), that is massively parallel processing.

Step S102, creating a connection between the visual data intelligence platform and the distributed in-memory database via python driver and SQLAlchemy framework in the visual data intelligence platform.

In this embodiment, creating a connection between the visual data intelligence platform and the distributed in-memory database via a python driver for the distributed in-memory database and the SQLAlchemy framework.

SQLAlchemy is a framework for manipulating databases via ORM in Python. The SQLAlchemy object-relational mapper provides a method for associating user-defined Python classes with database tables, and associating instances of these classes (objects) with rows in their corresponding tables. It consists of a system for transparently synchronizing all changes in state between objects and their associated rows, called units of work, and a system for expressing database queries based on user-defined classes and their defined relationships to each other.

Step S103, generating SQL table building statements in the visual data intelligence platform based on association information corresponding to the target heterogeneous data.

In this embodiment, the association information includes an association data table, an association field and an association type, for example, if the target heterogeneous data includes the above-mentioned tableA.c1 field and tableB.c1 field, the association data table is data table dbA.tableA and data table dbB.tableB, and the association field is tableA.c1 field and tableB.c1 field, and the association type can be inner connection.

Based on the association information, the SQL table creation statement can be generated in the visual data intelligence platform, and the SQL table creation statement can be passed to the distributed in-memory database, and in the specific application scenario of this application, the SPL build statement can be spliced in the way of create table <table_name1_table_name2> as select* from <table_name1> <join_method> <table_name2> on <column_1>=<column2>.

To improve data processing efficiency, in some embodiments of the present invention, after creating a connector in the distributed in-memory database corresponding to each target data source where the target heterogeneous data is located via a JDBC driver, the method further comprises:

mapping the table name information of the associated data table to the distributed in-memory database based on the connector name, the data source name of the target data source, and the table name of the associated data table.

In this embodiment, after creating the connectors, each connector is named, mapping the table name information of the associated data table to the distributed in-memory database based on the connector name, the data source name, and the table name of the associated data table.

In order to improve data processing efficiency, in some embodiments of the present invention, mapping the table name information of the associated data table to the distributed in-memory database based on the connector name, the data source name of the target data source, and the table name of the associated data table, specifically by:

using the connector name as the Catalog of the distributed in-memory database, the data source name as the Schema of the distributed in-memory database, and the table name as the Table of the distributed in-memory database.

mapping the table name information to the distributed in-memory database based on Catalog. Schema. table.

In this embodiment, for example, the above-mentioned data table dbA.tableA corresponds to a connector name connA, the data table dbA.tableA corresponds to a data source name MySQL, and the table name of the data table dbA.tableA is tableA. Thus, for the data table dbA.tableA, connA is used as the distributed in-memory database's Catalog, MySQL is used as the Schema of the distributed in-memory database, and tableA is used as the Table of the distributed in-memory database. for the data table dbB.tableB, and so on.

In order to reliably create SQL table building statements, in some embodiments of the present invention, before generating SQL table building statements in the visual data intelligence platform based on association information corresponding to the target heterogeneous data, the method further comprises:

selecting and adding the association information in the visual data intelligence platform.

In this implementation, the association information corresponding to the target heterogeneous data can be selected from a variety of association information in the visual data intelligence platform, and the association information can be selected to be added in the front end of the visual data intelligence platform.

In order to improve data processing efficiency, in some embodiments of the present invention, the associated data table is added to the visual data intelligence platform based on a data table association mapping, the data table association mapping being determined based on the connection name of the visual data intelligence platform to the distributed in-memory database, the connector name and the table name.

In this embodiment, the associated data table is added to the visual data intelligence platform based on the data table association mapping, the data table association mapping being determined based on the connection name of the visual data intelligence platform to the distributed in-memory database, the connector name and the table name, for example, for the above data table dbA.tableA, the connection name of the visual data intelligence platform and the distributed in-memory database is rdp1, the connector name is connA, the table name is tableA, and rdp1.connA.tableA are selected for addition in the visual data intelligence platform.

Step S104, fetching the target heterogeneous data from the target data source via each the connector in the distributed in-memory database based on the SQL table building statements, and generating a target data table with plurality of table associations.

In this embodiment, the SQL table building statement is executed in the distributed in-memory database, the target heterogeneous data is obtained from the target data source via each connector, and the multi-table associated target data table is generated. For example, for the above data table dbA.tableA and data table dbB.tableB, tableA and tableB are associated to generate the target data table, and the target data table can be named tableA_tableB.

In order to improve data processing efficiency, in some embodiments of the present invention, fetching the target heterogeneous data from the target data source via each the connector in the distributed in-memory database based on the SQL table building statements, specifically by:

splitting the SQL table building statement into a plurality of single table search statements;
sequentially extracting the target heterogeneous data from each the target data source to the distributed in-memory database via each the connector according to each the single table search statement, and generating the target data table in the distributed in-memory database.

In this implementation, the SQL table building statement is first split into plurality of single table search statements, and the data is extracted from the target data source to the distributed in-memory database according to the single table search statement in order, and then the target data table is generated in the distributed in-memory database.

It should be noted that the above embodiment of the scheme is only a specific implementation of the present invention, and other ways to obtain the target heterogeneous data from the target data source through each connector in the distributed in-memory database based on the SQL table building statement, and generate the target data table associated with plurality of tables are within the scope of protection of embodiments of the present invention.

Step S105, visualizing the target heterogeneous data in the visual data intelligence platform based on the target data table.

In order to reliably visualize the target heterogeneous data, in some embodiments of the present invention, visualizing the target heterogeneous data in the visual data intelligence platform based on the target data table, specifically by:

mapping the associated data table to the target data table based on the SQLAlchemy framework, and recording the target table name of the target data table in the metadata database;
selecting the target table name in the visual data intelligence platform, and obtaining the visual data corresponding to the target data table from the distributed in-memory database based on the target table name;
returning the visual data to the front end for visual display of the target heterogeneous data.

In this embodiment, first mapping the associated data table with the target data table based on SQLAlchemy framework, recording the target table name of the target data table (such as tableA_tableB) in the metadata database, then selecting the target table name in the visualization data intelligence platform, and getting the corresponding visualization data from the distributed in-memory database based on the target table name, and then returning the visualization to the front-end for display.

In order to reliably visualize the target heterogeneous data, in some embodiments of this application, obtaining the visual data corresponding to the target data table from the distributed in-memory database based on the target table name, specifically by:

generating SQL statements based on the target table names;
searching the distributed in-memory database based on the SQL statement, and obtaining the visual data based on the search results.

In this embodiment, the SQL statement is generated based on the target table name, and the SQL statement is passed to the distributed in-memory database for searching, and the search result is used as the visualization data.

It is understood that the order of steps S101 and S102 can be interchanged.

As shown in FIG. 2, the structure of a system including a visual data intelligence platform, a distributed in-memory database, and plurality of heterogeneous data sources is shown in an embodiment, in the figure, the visual data intelligence platform connects to distributed in-memory databases via python driver and SQLAlchemy framework, the distributed in-memory database includes SQL parser and optimizer, and MPP execution engine, the distributed in-memory database is connected to each data source through connectors, including MOXE connector, RDBMS connector, JDBC connector and Hadoop connector, and the data sources include MOXE data store, RDBMS data store, JDBC compatible data store, HIVE and HDFS.

By applying the above technical solution, in the system including visual data intelligence platform, distributed in-memory database and plurality of heterogeneous data sources, when a visual display command for the target heterogeneous data is detected, creating a connector in the distributed in-memory database corresponding to each target data source where the target heterogeneous data is located via a JDBC driver, and connecting the distributed in-memory database and each the target data source via each the connector; creating a connection between the visual data intelligence platform and the distributed in-memory database via python driver and SQLAlchemy framework in the visual data intelligence platform; generating SQL table building statements in the visual data intelligence platform based on association information corresponding to the target heterogeneous data; fetching the target heterogeneous data from the target data source via each the connector in the distributed in-memory database based on the SQL table building statements, and generating a target data table with plurality of table associations; visualizing the target heterogeneous data in the visual data intelligence platform based on the target data table, and achieving intelligent visual analysis and display of cross-source heterogeneous data without changing the data in the production database and without affecting the business code, which improves the data processing efficiency and security, and avoids the cost increase caused by the interface transformation.

In order to further elaborate the technical idea of embodiments of the present invention, the technical solution of embodiments of the present invention is described in the context of a specific application scenario.

In this example, the MySQL database and the PostgreSQL database are used as the data sources, and the MySQL database has the data table dbA.tableA and the PostgreSQL database has the data table dbB.tableB. Perform an inner join of field tableA.c1 and field tableB.c1 of these two tables, and display a pie chart. The steps are as follows:

1. Create MySQL and PostgreSQL connectors named connA and connB in the distributed all-memory database, and connect the distributed all-memory database to the two heterogeneous data sources MySQL and PostgreSQL at the same time, respectively, the code is as follows:
create connector connA type mysql with database='dbA', host='127.0.0.1', port='3306', users='root', password='root'
NODE*CATALOG*SCHEMA*TABLE*;
create connector connB type postgres with database='dbB', host='127.0.0.1', port='5432', user='root', password='root'
NODE*CATALOG*SCHEMA*TABLE*;
2. Connect to the distributed full-memory database via SQLAlchemy URI in the visual data intelligence platform, the connection name is rdp1.
3. Choose to add rdp1.connA.tableA and rdp1.connB.tableB in the visual data intelligence platform to establish the data table association mapping; where the association method is inner join, and the associated fields are tableA.c1 and tableB.c1.
4. After receiving the association information from the front-end, the visual data intelligence platform creates a SQL table creation statement, the SQL table creation statement is as follows:
create tableA_tableB as select * from connA.dbA.tableA inner join connB.dbB.tableB on connA.tableA.c1=connB.tableB.c1;
5. The above SQL table building statement is passed to the distributed all-memory database through the python driver of the distributed all-memory database, thus creating a data table named tableA_tableB in the in-memory library of the distributed all-memory database as the target data table of the multi-table association.
6. The visual data intelligence platform obtains the tag name of the newly created target data table through SQLAlchemy and records it in the metadata database.
7. Select the tableA_tableB table in the interface of the visual data intelligence platform and generate the pie chart to calculate the number of fields c2. After the front-end is configured, the following SQL statement will be passed to the distributed all-memory database for search and the search result will be returned as visual data.
The SQL statement is as follows:
select c2 as c2, count(*) as count from rdp.tableA_tableB group by c2 order by count DESC;

Corresponding to a cross-source heterogeneous data intelligent visualization and analysis display method in this application embodiment, this application embodiment also proposes an apparatus for intelligent visual analysis and display of cross-source heterogeneous data, applied to a system comprising a visual data intelligence platform, a distributed in-memory database and a plurality of heterogeneous data sources, as shown in FIG. 3, the apparatus comprises:

a first creation module 301, for when a visual display command for the target heterogeneous data is detected, creating a connector in the distributed in-memory database corresponding to each target data source where the target heterogeneous data is located via a JDBC driver, and connecting the distributed in-memory database and each the target data source via each the connector;

a second creation module 302, for creating a connection between the visual data intelligence platform and the distributed in-memory database via python driver and SQLAlchemy framework in the visual data intelligence platform;

a first generation module 303, for generating SQL table building statements in the visual data intelligence platform based on association information corresponding to the target heterogeneous data;

a second generation module 304, for fetching the target heterogeneous data from the target data source via each the connector in the distributed in-memory database based on the SQL table building statements, and generating a target data table with plurality of table associations;

a display module 305, for visualizing the target heterogeneous data in the visual data intelligence platform based on the target data table;

wherein the association information includes an association data table, an association field and an association type.

Although the invention has been illustrated and described in greater detail with reference to the exemplary embodiment, the invention is not limited to the examples disclosed, and further variations can be inferred by a person skilled in the conventional art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for intelligent visual analysis and display of cross-source heterogeneous data, wherein the method is being applied to a system comprising a visual data intelligence platform, a distributed in-memory database and a plurality of heterogeneous data sources, the method comprising:

when a visual display command for the target heterogeneous data is detected, creating a connector in the distributed in-memory database corresponding to each target data source where the target heterogeneous data is located via a Java Database Connectivity (JDBC) driver, and connecting the distributed in-memory database and each the target data source via each connector;

creating a connection between the visual data intelligence platform and the distributed in-memory database via python driver and SQLAlchemy framework of the distributed in-memory database in the visual data intelligence platform;

generating SQL table building statements in the visual data intelligence platform based on associated information corresponding to the target heterogeneous data;

fetching the target heterogeneous data from the target data source via each connector in the distributed in-memory database based on the SQL table building statements, and generating a target data table associated with a plurality of tables;

visual displaying the target heterogeneous data in the visual data intelligence platform based on the target data table; wherein, the associated information includes an associated data table, an associated field and an associated type; and visual displaying the target heterogeneous data in the visual data intelligence platform based on the target data table, specifically by: mapping the associated data table to the target data table based on the SQLAlchemy framework, and recording the target table name of the target data table in the metadata database; selecting the target table name in the visual data intelligence platform, and obtaining the visual data corresponding to the target data table from the distributed in-memory database based on the target table name; returning the visual data to the front end for visual displaying the target heterogeneous data.

2. The method according to the claim 1, wherein obtaining the visual data corresponding to the target data table from the distributed in-memory database based on the target table name, specifically by:

generating SQL statement based on the target table name; and searching the distributed in-memory database based on the SQL statement, and obtaining the visual data based on the search result.

3. The method according to the claim 1, wherein fetching the target heterogeneous data from the target data source via each connector in the distributed in-memory database based on the SQL table building statement, and generating a target data table associated with a plurality of tables, specifically by:

splitting the SQL table building statement into a plurality of single table search statements; and sequentially extracting the target heterogeneous data from each the target data source to the distributed in-memory database via each the connector according to each the single table search statement, and generating the target data table in the distributed in-memory database.

4. The method according to the claim 1, wherein after creating a connector in the distributed in-memory database corresponding to each target data source where the target heterogeneous data is located via a JDBC driver, the method further comprising:

mapping the table name information of the associated data table to the distributed in-memory database based on the connector name, the data source name of the target data source, and the table name of the associated data table.

5. The method as recited in claim 1, wherein mapping the table name information of the associated data table to the distributed in-memory database based on the connector name, the data source name of the target data source, and the table name of the associated data table, specifically by:

using the connector name as the Catalog of the distributed in-memory database, the data source name as the Schema of the distributed in-memory database, and the table name as the Table of the distributed in-memory database, mapping the table name information to the distributed in-memory database based on Catalog. Schema. table.

6. The method according to the claim 1, wherein before generating SQL table building statements in the visual data intelligence platform based on associated information corresponding to the target heterogeneous data, the method further comprising:

selecting and adding the associated information in the visual data intelligence platform.

7. The method according to the claim 1, wherein the associated data table is added to the visual data intelligence platform based on a data table associated mapping, the data table associated mapping being determined based on the connection name of the visual data intelligence platform to the distributed in-memory database, the connector name and the table name.

8. An apparatus for intelligent visual analysis and display of cross-source heterogeneous data, wherein it is applied to a system comprising a visual data intelligence platform, a distributed in-memory database and a plurality of heterogeneous data sources, the apparatus comprises: a processor, a first creation module, for when a visual display command for the target heterogeneous data is detected, creating a connector in the distributed in-memory database corresponding to each target data source where the target heterogeneous data is located via a Java Database Connectivity (JDBC) driver, and connecting the distributed in-memory database and each the target data source via each the connector; a second creation module, for creating a connection between the visual data intelligence platform and the distributed in-memory database via python driver and SQLAlchemy framework in the visual data intelligence platform; a first generation module, for generating SQL table building statements in the visual data intelligence platform based on associated information corresponding to the target heterogeneous data; a second generation module, for fetching the target heterogeneous data from the target data source via each the connector in the distributed in-memory database based on the SQL table building statements, and generating a target data table associated with a plurality of tables; a display module, for visualizing the target heterogeneous data in the visual data intelligence platform based on the target data table; wherein, the associated information includes an associated data table, an associated field and an associated type;

visualizing the target heterogeneous data in the visual data intelligence platform based on the target data table, specifically by: mapping the associated data table to the target data table based on the SQLAlchemy framework, and recording the target table name of the target data table in the metadata database; selecting the target table name in the visual data intelligence platform, and obtaining the visual data corresponding to the target data table from the distributed in-memory database based on the target table name; returning the visual data to the front end for visual display of the target heterogeneous data.

9. A non-transitory computer-readable storage medium, wherein the computer-readable storage medium has commands stored in it, when the commands are run on the terminal equipment, causing the terminal equipment to perform a method comprising:

when a visual display command for the target heterogeneous data is detected, creating a connector in the distributed in-memory database corresponding to each target data source where the target heterogeneous data is located via a Java Database Connectivity (JDBC) driver, and connecting the distributed in-memory database and each the target data source via each connector;

creating a connection between the visual data intelligence platform and the distributed in-memory database via python driver and SQLAlchemy framework of the distributed in-memory database in the visual data intelligence platform;

generating SQL table building statements in the visual data intelligence platform based on associated information corresponding to the target heterogeneous data;

fetching the target heterogeneous data from the target data source via each connector in the distributed in-memory database based on the SQL table building statements, and generating a target data table associated with a plurality of tables;

visual displaying the target heterogeneous data in the visual data intelligence platform based on the target data table; wherein, the associated information includes an associated data table, an associated field and an associated type; and visual displaying the target heterogeneous data in the visual data intelligence platform based on the target data table, specifically by: mapping the associated data table to the target data table based on the SQLAlchemy framework, and recording the target table name of the target data table in the metadata database; selecting the target table name in the visual data intelligence platform, and obtaining the visual data corresponding to the target data table from the distributed in-memory database based on the target table name; returning the visual data to the front end for visual displaying the target heterogeneous data.

* * * * *